United States Patent
Sueoka et al.

(10) Patent No.: US 6,468,628 B2
(45) Date of Patent: Oct. 22, 2002

(54) MAGNETIC RECORDING MEDIUM

(75) Inventors: Masanori Sueoka, Otsu (JP); Akimitsu Tsukuda, Otsu (JP); Nobuaki Ito, Kasugai (JP)

(73) Assignee: Toray Industries, Inc., Tokyo (JP)

( * ) Notice: Subject to any disclaimer, the term of this patent is extended or adjusted under 35 U.S.C. 154(b) by 139 days.

(21) Appl. No.: 09/759,332

(22) Filed: Jan. 16, 2001

(65) Prior Publication Data

US 2001/0008714 A1 Jul. 19, 2001

(30) Foreign Application Priority Data

Jan. 18, 2000 (JP) .................................. 2000-008698

(51) Int. Cl.$^7$ ............................................... G11B 5/733
(52) U.S. Cl. .................... 428/141; 428/216; 428/474.4; 428/694 TR; 428/694 SG
(58) Field of Search ............................. 428/141, 216, 428/474.4, 694 SG, 694 TR, 900

(56) References Cited

U.S. PATENT DOCUMENTS 4,688,130 A 8/1987 Nakanouchi et al. ....... 360/135

FOREIGN PATENT DOCUMENTS

| EP | 0 778 308 A1 | 6/1997 |
| EP | 0 842 754 A1 | 5/1998 |
| EP | 0 882 759 A1 | 12/1998 |
| EP | 0 913 421 A1 | 5/1999 |
| EP | 0 947 315 A1 | 10/1999 |
| JP | 11-152353 | 6/1999 |

OTHER PUBLICATIONS

Patent Abstracts of Japan; vol. 1998, No. 10, Aug. 31, 1998 & JP 10 114038 A (Toray Ind. Inc.), May 6, 1998 *abstract*.
Database WPI; Section Ch, Week 198533; Derwent Publications Ltd., London, GB; AN 1985–200964; XP002163231 & JP 60 127523 A (Toray Ind. Inc.), Jul. 8, 1985 *abstract*.
Patent Abstracts of Japan; vol. 011, No. 097 (P–560), Mar. 26, 1987 & JP 61 246919 A (Toray Ind. Inc.), Nov. 4, 1986 *abstract*.
Patent Abstracts of Japan; vol. 009, No. 072 (P–345), Apr. 2, 1985 & JP 59 203237 A (Matsushita Denki Sangyo KK), Nov. 17, 1984 *abstract*.

*Primary Examiner*—Stevan A. Resan
(74) *Attorney, Agent, or Firm*—Kubovcik & Kubovcik

(57) ABSTRACT

Disclosed is a magnetic recording medium having a magnetic layer directly formed on at least one surface of a base film that comprises, as the essential ingredient, an aromatic polyamide, in which the number of protrusions having a height of at least 10 nm on the surface of the magnetic layer, $N_{a(10)}$ (/mm$^2$), the number of protrusions having a height of at least 50 nm thereon, $N_{a(50)}$ (/mm$^2$), and the number of protrusions having a height of at least 10 nm on the surface of the base film coated with the magnetic layer, $N_{a(10)}'$ (/mm$^2$), all satisfy the following formulae:

$$2\times10^4 \leq N_{a(10)} \leq 2\times10^7,$$

$$0 \leq N_{a(50)} \leq 5\times10^4,$$

$$-0.9 \leq (N_{a(10)}-N_{a(10)}')/N_{a(10)}' \leq 0.$$

The medium has, as the non-magnetic substrate (base film), a highly-tough, aromatic polyamide film, and the surface profile of its magnetic layer and that of its base film are specifically controlled.

8 Claims, No Drawings

MAGNETIC RECORDING MEDIUM

BACKGROUND OF THE INVENTION

1. Field of the Invention

The present invention relates to a magnetic recording medium favorable to external recording media for recording computer data thereon.

2. Description of the Related Art

With the recent popularization of personal computers, magnetic recording media for external memory media for recording computer data thereon are much studied and developed. For practicable magnetic recording media for such application, much desired is increasing their recording capacity along with realizing down-sized computers for them and increasing their information processing capability. With the surroundings of magnetic recording media being much diversified these days, the requirements are increasing more than before for the reliability on the media usable in various conditions (especially, even in greatly varying temperature and humidity conditions) and the reliability on data storage in the media, and also for the reliability on stable data recording and reading even in high-speed repeated use of the media.

Ordinary magnetic recording media have a magnetic layer formed on a non-magnetic substrate of, for example, synthetic resin. For increasing the recording capacity of such magnetic recording media, some methods are believed to be effective. For example, one is to reduce the particle size of the magnetic powder to be used, or to improve the dispersibility of the magnetic powder, or to thin the magnetic layer itself. This is for increasing the recording density of the magnetic layer. Another is to reduce the overall thickness of the magnetic recording medium. In order to ensure good sensitivity of magnetic recording media (especially for high-frequency output), preferred are planarized magnetic layers, which, however, often cause some troubles of winding disorder and running failure. Some means for evading the troubles are known and are often employed in the art. For example, the surface of the substrate is roughened, or a back coat layer is formed on the substrate opposite to the magnetic layer. In particular, thin magnetic recording media are often problematic in that their self-sustenance and strength are poor. Therefore, the strength of the substrate and also the surface condition of magnetic recording media are important parameters for ensuring good running durability in repeated use of the media.

Some techniques of reducing the overall thickness of magnetic recording media in some degree are known. One example is a magnetic tape disclosed in Japanese Patent Laid-Open No. 215350/1994. One specific example of the magnetic tape disclosed herein has an overall thickness of 9.5 µm. They say therein that polyester, especially polyethylene naphthalate (PEN) is preferred for the material of the non-magnetic substrate of the magnetic tape.

We, the present inventors have studied the applicability of various types of very thin, magnetic recording media to external recording media for recording computer data thereon, and as a result, have found that even the thin magnetic tape described in Japanese Patent Laid-Open No. 215350/1994 could not still attain the intended recording capacity enough for computer data recording thereon. This is because the magnetic tape described in that laid-open specification is still thick, and the necessary length of the tape could not be housed in a predetermined cartridge. Therefore, for further enlarging its recording capacity enough for computer data recording thereon, it is necessary to further thin the tape.

On the other hand, it is known that aromatic polyamide films are preferred to conventional polyester films for non-magnetic substrates for magnetic tapes, as the former are tougher than the latter. It has been found that such an aromatic polyamide film substrate is, even when thinned, still tough and its dimension change is small even in much varying temperature and humidity conditions, and therefore the reliability on it for use in magnetic tapes for data storage thereon is good.

However, when the overall thickness of a magnetic tape having such a non-magnetic, aromatic polyamide film substrate is much reduced, the strength of the tape itself is thereby lowered, as so mentioned hereinabove, and, as a result, the tape could not ensure good running durability and will at last fail to run smoothly while used repeatedly. In addition, the tape, after having been thus fatigued, often has some negative influences on its output capacity. To solve the problems, therefore, it is necessary to improve the surface condition of the non-magnetic substrate. In particular, magnetic powder having a reduced particle size is preferred in the art, and thin magnetic layers are desired. For forming such thin magnetic layers, vacuum evaporation, ion plating, sputtering, cluster ion beam deposition and the like (these are for directly forming a magnetic layer of a magnetic metal such as Fe, Co, Ni or Cr, either alone or in the form of an alloy of such magnetic metals, on a substrate) are preferred to conventional coating. For these, the surface condition of the non-magnetic substrates and even the magnetic recording media produced must be much more optimized.

Some examples of non-magnetic, aromatic polyamide film substrates are known. For example, Japanese Patent Laid-Open No. 127523/1985, and U.S. Pat. Nos. 5,853,907 and 5,993,938 disclose magnetic recording media for which the height and the number of protrusions formed on the surface of the substrate are specifically defined. However, since the surface of the substrate has a large number of relatively high protrusions and is therefore too rough, the magnetic recording media disclosed are still problematic in that their reproduction output is lowered when the magnetic layer therein is thinned.

Japanese Patent Laid-Open No. 222837/1998 discloses a magnetic recording medium for which the surface roughness of the non-magnetic, aromatic polyamide film substrate is specifically defined. In this, the surface of the film substrate used is relatively planarized to have a surface roughness SRa of from 0.1 to 3 nm. However, there is no strict correlation between the surface roughness and the protrusions density of the film substrate. Therefore, when the magnetic layer of the medium is thinned, its surface condition could not be well controlled, and, as a result, the medium could not ensure good reproduction output. Some other examples of non-magnetic, aromatic polyamide film substrates are disclosed in Japanese Patent Laid-Open Nos. 209313/1992, 114038/1998 and 139895/1998, but all of these are also problematic like those as above.

Japanese Patent Laid-Open No. 25446/1999 and WO98/008892 disclose magnetic recording media for which the surface of the substrate is roughened to have protrusions thereon. In these, the height of each protrusions is lowered, but the protrusions density could not be controlled to a satisfactory degree for thin magnetic layers. Therefore, the reproduction output of the magnetic recording media disclosed therein is often low. In addition, the surface condition of the magnetic layer is not specifically defined therein, and its significant change is inevitable depending on the method for forming the magnetic layer.

Japanese Patent Laid-Open No. 285432/2000 discloses a magnetic recording medium for which the aromatic polyamide film substrate contains fine particles in its one surface. However, since the substrate has a large number of relatively high protrusions on its surface, the magnetic recording medium having the substrate is also problematic in that its reproduction output is lowered when the magnetic layer therein is thinned. In addition, an additional layer is sandwiched between the magnetic layer and the substrate in this medium, and therefore the overall thickness of the medium is difficult to reduce.

Japanese Patent Laid-Open No. 191213/1999 discloses a magnetic recording medium for which the ratio of the surface roughness of the film substrate to that of the medium is specifically defined. However, since the surface of the magnetic recording medium is rougher than that of the film substrate, the medium is also problematic in that its reproduction output is low and its magnetic layer easily peels off.

SUMMARY OF THE INVENTION

The present invention is to provide a magnetic recording medium, in which the base film serving as a non-magnetic substrate comprises, as the essential ingredient, an aromatic polyamide and is therefore tougher than a conventional polyester film, and the base film is kept indirect contact with the magnetic layer, and in which the surface characteristic of the magnetic layer and that of the non-magnetic substrate are specifically controlled so as to make the medium have increased recording capacity and improved running durability and to thereby enhance the reliability on the medium for data recording thereon, and which is therefore favorable for computer data recording thereon.

Specifically, the invention provides a magnetic recording medium having a magnetic layer directly formed on at least one surface of a base film that comprises, as the essential ingredient, an aromatic polyamide, in which the number of protrusions having a height of at least 10 nm on the surface of the magnetic layer, $N_{a(10)}$ (/mm$^2$), the number of protrusions having a height of at least 50 nm thereon, $N_{a(50)}$ (/mm$^2$), and the number of protrusions having a height of at least 10 nm on the surface of the base film coated with the magnetic layer, $N_{a(10)}'$ (/mm$^2$), all satisfy the following formulae:

$$2\times10^4 \leq N_{a(10)} \leq 2\times10^7,$$

$$0 \leq N_{a(50)} \leq 5\times10^4,$$

$$-0.9 \leq (N_{a(10)}-N_{a(10)}')/N_{a(10)}' \leq 0.$$

DESCRIPTION OF THE PREFERRED EMBODIMENTS

The magnetic recording medium of the invention has a magnetic layer directly formed on at least one surface of a base film that comprises, as the essential ingredient, an aromatic polyamide, in which the number of protrusions having a height of at least 10 nm on the surface of the magnetic layer, $N_{a(10)}$ (/mm$^2$), the number of protrusions having a height of at least 50 nm thereon, $N_{a(50)}$ (/mm$^2$), and the number of protrusions having a height of at least 10 nm on the surface of the base film coated with the magnetic layer, $N_{a(10)}'$ (/mm$^2$), all must satisfy the following formulae:

$$2\times10^4 \leq N_{a(10)} \leq 2\times10^7,$$

$$0 \leq N_{a(50)} \leq 5\times10^4,$$

$$-0.9 \leq (N_{a(10)}-N_{a(10)}')/N_{a(10)}' \leq 0.$$

The parameters $N_{a(10)}$, $N_{a(50)}$ and $N_{a(10)}'$ all satisfying the formulae mentioned above ensure well balanced runnability and reproduction output of the magnetic recording medium. The effect is remarkable when the magnetic layer of the medium is thin and the recording density thereof is high. If $N_{a(10)}$ is smaller than $2\times10^4$, the surface of the magnetic layer is too smooth and the medium could not run well. If $N_{a(10)}$ is larger than $2\times10^7$, the surface of the magnetic layer is too rough, and the ratio S/N of the medium will be lowered. For well-balanced runnability and magnetic characteristics of the magnetic recording medium, preferably $2\times10^4 \leq N_{a(10)} \leq 5\times10^6$, more preferably $10^6 \leq N_{a(10)} \leq 5\times10^6$. If $N_{a(50)}$ is over $5\times10^4$, it will cause dropout. For better magnetic characteristics of the medium, more preferably $0 \leq N_{a(50)} \leq 2\times10^4$. If $N_{a(10)}$ and $N_{a(10)}'$ do not satisfy the formula as above, the durability of the magnetic recording medium having a thin magnetic layer directly formed on the base film will be poor, and such a thin magnetic film will peel off when the medium is run repeatedly. For better durability of the medium, more preferably $-0.7 \leq (N_{a(10)}-N_{a(10)}')/N_{a(10)}' \leq 0$, even more preferably $-0.7 \leq (N_{a(10)}-N_{a(10)}')/N_{a(10)}' \leq -0.2$. The magnetic recording medium of the invention in which the base film of an aromatic polyamide is kept in direct contact with the magnetic layer is meant to indicate that it does not have any non-magnetic layer such as an adhesive layer or the like between the base film and the magnetic layer. For laminate films, however, all the layers constituting one laminate film are considered to have been integrated into one film as a whole. Therefore, films coated with some material or laminated with an ultra-thin layer for forming protrusions on their surface are defined as the base film referred to herein.

In the magnetic recording medium of the invention, the back surface of the base film opposite to that coated with the magnetic layer may be coated with a back coat layer. Preferably, the number of protrusions having a height of at least 50 nm, $N_{b(50)}$, on the surface of the back coat layer satisfies $2\times10^4 \leq N_{b(50)} \leq 5\times10^6$. With that, the surface of the back coat layer is not too much planar, and the magnetic tap having such a back coat layer can reduce its friction against a guide pin and so on. Further, when the back coat layer has high protrusions of low density on its surface, its runnability will be better. Therefore, the number of protrusions having a height of at least 100 nm, $N_{b(100)}$, on the surface of the back coat layer preferably satisfies $0 \leq N_{b(100)} \leq 5\times10^4$. If $N_{b(50)}$ is smaller than $2\times10^4$, it is unfavorable since the surface of the back coat layer is too planar to ensure good runnability of the medium. If $N_{b(50)}$ is larger than $5\times10^6$, or if $N_{b(100)}$ is larger than $5\times10^4$, it is unfavorable since the protrusions on the back coat layer will transfer onto the magnetic surface to worsen the magnetic properties of the medium.

The base film for the magnetic recording medium of the invention comprises, as the essential ingredient, an aromatic polyamide, and the base film of the type has good physical properties including tensile strength. Therefore, even if the tape of the medium is very thin, it is strong and is enough for practical use.

The aromatic polyamide for use in the invention includes polyamides having repetitive units of the following formula (I) and/or formula (II):

(I)

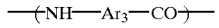

(II)

wherein $Ar_1$, $Ar_2$ and $Ar_3$ include, for example, the following:

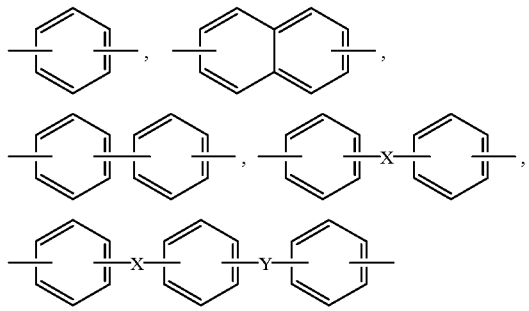

and X and Y are selected from —O—, —CH$_2$—, —CO—, —CO$_2$—, —S—, —SO$_2$—, —C(CH$_3$)$_2$— and the like.

The hydrogen atoms on the aromatic ring of the polyamide may be partly substituted with any substituent of a halogen atom including fluorine, bromine and chlorine atoms (especially chlorine), a nitro group, an alkyl group including methoxy, ethoxy and propoxy groups (especially methyl), or an alkoxy group including methoxy, ethoxy and propoxy groups. The substituted polyamides are preferred, as their moisture absorption is low and their dimensional change depending on the ambient humidity change is small. The hydrogen atom in the amide bonds constituting the polymer may also be substituted with any substituent. In the aromatic polyamide for use in the invention, the aromatic ring is preferably para-oriented to a degree of at least 80%, more preferably at least 90% of all the aromatic rings constituting the polymer. With para-oriented aromatic rings to such a degree, the Young's modulus of the films of the polyamide is high and the thermal shrinkage thereof is low. The para-orientation referred to herein is meant to indicate that the divalent bonds to form the main chain of the aromatic rings in the polyamide are coaxial or parallel to each other.

The base film for the magnetic recording medium of the invention contains particles for forming the protrusions on the surface of the base film and also on the magnetic surface of the medium.

The particles may be inorganic particles or organic particles. The inorganic particles employable herein include, for example, particles of titanium oxide, aluminium oxide, zirconium oxide, calcium oxide, colloidal silica, carbon black, zeolite, and also fine powders of metals.

The organic particles also employable herein include, for example, particles of organic polymers such as crosslinked polyvinylbenzene, crosslinked acryl, crosslinked polystyrene, polyester, polyimide, polyamide and fluororesin, as well as inorganic or organic particles coated with any of such organic polymers.

Preferably, the mean particle size of the particles falls between 10 nm and 500 nm, and the content of the particles in the base film falls between 0.01% by weight and 10% by weight of the aromatic polyamide to form the film, for satisfying the specific requirements of the invention to define the surface condition of the base film and that of the magnetic surface of the magnetic recording medium.

Apart from the method of adding such particles to the base film, an alloy polymer except the aromatic polyamide to be the essential ingredient of the base film may be added to the base film. In this case, the intended protrusions are formed on the surface of the base film through phase separation of the alloy polymer in the film.

Preferably, the base film for use in the invention has a Young's modulus in tension of at least 9.8 GPa in at least one direction, as it is tough and its self-sustaining is high even when thinned. For higher self-sustaining of the base film capable of realizing further reduction in the thickness of the magnetic recording medium, it is more desirable that the Young's modulus of the base film is at least 9.8 GPa in every direction.

Preferably, the degree of elongation of the base film for use in the invention is at least 10%, more preferably at least 20%, even more preferably at least 30%. With the base film having such a preferred degree of elongation, the tape of the medium of the invention is well flexible.

Also preferably, the moisture absorption of the base film for use in the invention is at most 5%, more preferably at most 3%, even more preferably at most 2%. Not absorbing too much moisture, the base film is preferred since its dimensional change depending on the ambient humidity change is retarded and since the magnetic layer formed on it ensures good electromagnetic transduction in any condition.

Also preferably, the thermal shrinkage of the base film for use in the invention is at most 0.5%, more preferably at most 0.3%, at 200° C. for 10 minutes. Not so much shrunk under heat, the base film is preferred since its dimensional change depending on the ambient temperature change is retarded and since the magnetic layer formed on it ensures good electromagnetic transduction in any condition.

For example, the base film for use in the invention may be produced according to the method mentioned below, which, however, is not intended to restrict the scope of the invention.

When the aromatic polyamide for the base film is prepared from an aromatic di-acid dichloride and an aromatic diamine, the two components are polymerized in a mode of solution polymerization in an aprotic organic polar solvent such as N-methyl-2-pyrrolidone, dimethylacetamide, or dimethylformamide.

In this step, water and other substances that may retard the reaction must not be in the reaction system, in order to prevent the formation of undesired low-molecular-weight substances. Preferably, the system is stirred to enhance the reaction efficiency. A solubilizer such as calcium chloride, magnesium chloride, lithium chloride, lithium bromide or lithium nitrate may be added to the system.

When the monomers of such an aromatic di-acid dichloride and an aromatic diamine are polymerized, hydrogen chloride is formed as a side product. To neutralize it, an inorganic neutralizer such as typically a salt composed of a Group I or II cation and an anion such as a hydroxide or carbonate ion, or an organic neutralizer such as ethylene oxide, propylene oxide, ammonia, triethylamine, triethanolamine or diethanolamine may be used. For improving the moisture resistance of the base film to be produced, any of benzoyl chloride, phthalic anhydride, acetic acid chloride or aniline may be added to the system having been polymerized, to thereby block the terminal groups of the polymer formed.

The polymer to give the base film for use herein preferably has an intrinsic viscosity (0.5 g of the polymer is dissolved in 100 ml of sulfuric acid, and measured at 30° C.) of at least 0.5.

The neutralized polymer solution may be directly formed into a base film for use in the invention; or the polymer is once isolated from it, and again dissolved in an organic solvent, and the resulting solution may be formed into a base film for use herein. The polymer concentration in the solution to be formed into the base film preferably falls between 2 and 40% by weight or so.

Particles such as those mentioned above are added to the polymer solution. In order to ensure uniform dispersion of the particles in the polymer solution, it is desirable that the particles are dispersed in a solvent having a viscosity of at most 10 poises, preferably at most 1 poise, prior to being added to the polymer solution. If the particles are directly added to the polymer solution, their mean particle size in the solution will be large and their particle size distribution therein will be also large. It is unfavorable since the surface of the base film formed from the polymer solution is too rough. The solvent in which the particles are dispersed is preferably the same as that for the polymer solution, but may any other one not having any negative influence on the film-forming property of the polymer solution. To disperse them in the solvent, for example, the particles are added to the solvent and dispersed therein by stirring with a mechanical stirrer, a ball mill, a sand mill or an ultrasonic stirrer. The particles may be added to the polymer solution, or, as the case may be, they may be added to the solvent in which the polymer is prepared through polymerization of monomers, or maybe added to the system where the polymer is prepared. They may be added to the polymer solution just before the solution is cast to form a film.

The polymer solution having been prepared in the manner as above is formed into a film in any mode of dry film formation, dry/wet film formation, wet film formation, or semi-dry/semi-wet film formation. Preferred is dry/wet film formation in which the surface morphology of the film formed is easy to control. One example of dry/wet film formation to form the base film for use herein from the polymer solution is described below.

A polymer solution to be formed into a film is extruded out through a die onto a support such as a drum or an endless belt, to thereby form a thin film layer thereon, then the solvent is removed from the layer, and the layer is dried to be a thin film. The drying temperature preferably falls between 100 and 210° C., more preferably between 120 and 180° C. If the drying temperature is lower than 100° C., the drying time will be long and therefore the productivity of the film will be extremely low. If, however, the drying temperature is higher than 210° C., it is unfavorable since the surface of the film is too rough. The drying time preferably falls between 4 and 12 minutes, more preferably between 5 and 10 minutes. Next, the thus-dried film is peeled off from the support, and then led into a wetting zone in which the film is processed for salt and solvent removal. If the gel film having been peeled off from the support is directly stretched and thermally fixed, without being passed through the wetting zone, it is unfavorable since the surface of the resulting film will be much roughened or the film will be curled.

Next, the film is stretched, dried and thermally fixed. For stretching the film, the hot air temperature preferably falls between $(Tg-50)°$ C. and $(Tg+50)°$ C. Tg (°C) is the glass transition temperature of the aromatic polyamide that forms the film. The areal draw ratio of the stretched film preferably falls between 1.2 and 3.5, more preferably between 1.2 and 3.0. The areal draw ratio is obtained by dividing the area of the stretched film by that of the original, non-stretched film. An areal draw ratio of smaller than 1 indicates that the film is relaxed.

While or after stretched, the film is thermally fixed. The temperature for thermal fixation preferably falls between 200 and 350° C. If the temperature is lower than 200° C., it is unfavorable since the Young's modulus of the stretched film is low; but if higher than 350° C., it is also unfavorable since the elongation of the stretched film is low and the film is be fragile.

The base film for use in the invention may be a laminate film. Such a laminate film may be prepared from two or more polymer solutions in any known method. For example, as in Japanese Patent Laid-Open No. 162617/1981, a plurality of polymer solutions may be layered while passing through a junction pipe, or may be layered in the inside of die. As the case may be, a film is first formed from any one of polymer solutions, then another one is cast over it and the solvent is removed to obtain a laminate film.

Preferably, the thickness of the base film of the magnetic recording medium of the invention falls between 1 and 5 $\mu$m. With such a thin base film, a longer tape of the magnetic recording medium can be wound up in one tape cartridge, and it has a larger volumetric recording capacity.

In the magnetic recording medium of the invention, a magnetic layer is directly formed on the base film. In this, therefore, the magnetic layer is kept in direct contact with the base film. For producing the magnetic recording medium of that type, employable is any of vapor deposition, ion plating, sputtering, cluster ion beam deposition or the like. Especially preferred is vapor deposition as producing better results.

Vapor deposition includes oblique incident deposition and vertical deposition, in which is formed a thin metal film consisting essentially of Co, Ni, Fe or the like, or a thin metal film consisting essentially of an alloy of such metals. For this, for example, usable is a ferromagnetic metal such as Co, Ni or Fe, or a ferromagnetic alloy such as Fe—Co, Co—Ni, Fe—Co—Ni, Fe—Cu, Co—Au, Co—Pt, Mn—Bi, Mn—Al, Fe—Cr, Co—Cr, Ni—Cr, Fe—Co—Cr, Co—Ni—Cr or Fe—Co—Ni—Cr. The film may be a single-layered or multi-layered film.

For vapor deposition, preferred is vacuum evaporation that comprises heating and evaporating a ferromagnetic material in a vacuum followed by depositing the vapor of the material on a base film. However, any other PVD technique is also employable, including, for example, ion plating that comprises ionizing a ferromagnetic material followed by plating it onto a base film; and sputtering in a glow discharge atmosphere of essentially argon in which atoms in the surface of the target of a ferromagnetic material are sputtered out by the argon ions and deposited on a base film. After having been thus coated with a thin magnetic layer, the base film is preferably processed under heat at 150° C. to 250° C. to prevent it from being curled. If desired, a hard carbon layer may be formed on the surface of the thin, metallic magnetic layer so as to enhance the durability and the weather resistance of the magnetic recording medium. It may be formed, for example, through sputtering or CVD. Also if desired, a lubricant layer may be formed on the layer. It improves the runnability of the magnetic recording medium based on the profile of the particulate protrusions of the magnetic material in the medium. For the lubricant, for example, employable are fatty acids and fatty acid esters.

The thickness of the magnetic layer of the magnetic recording medium of the invention preferably falls between 0.02 and 0.5 μm, as the medium with it enjoys favorable magnetic properties and good runnability, and has an increased recording (memory) capacity. For larger memory capacity of the medium, more preferably, the thickness of the magnetic layer falls between 0.03 and 0.2 μm, even more preferably between 0.03 and 0.08 μm.

Preferably, the overall thickness of the magnetic layer and the protective layer and the lubricant layer formed on the magnetic layer is from 10 to 100 times the mean roughness of the center surface of the base film coated with the magnetic layer, as well satisfying the requirements of the invention. The mean surface roughness is measured, for example, according to the method described by Jiro Nara in *Measurement and Evaluation of Surface Roughness* (General Technical Center, 1983).

On the other surface of the base film of the magnetic recording medium of the invention, opposite to that coated with the magnetic layer, preferably formed is a back coat layer. The back coat layer is basically composed of a non-magnetic powder and a binder. For the non-magnetic powder, preferred is carbon black. Preferably, the back coat layer contains an additional inorganic powder such as calcium carbonate, and any other inorganic powder having a Mohs' hardness of from 5 to 9.

Preferably, the back coat layer contains carbon black of two types that differ in the mean particle size. For this, preferred is a combination of fine carbon black having a mean particle size of from 10 to 20 mμ and coarse carbon black having a mean particle size of from 230 to 300 mμ. In general, adding such fine carbon black to the back coat layer lowers the sheet resistivity of the layer and lowers the light transmittance through the layer. In some magnetic recording devices, the light transmittance through the magnetic tape to be driven is often utilized for the signal for traveling the tape therein. For such devices, adding fine carbon black to the back coat layer is especially effective. In addition, fine carbon black well retains a lubricant. Therefore, when combined with a lubricant, it contributes to the reduction in the friction coefficient of the back coat layer. On the other hand, coarse carbon black having a mean particle size of from 230 to 300 mμ functions as a solid lubricant, and forms fine protrusions on the surface of the back coat layer. Therefore, it reduces the contact area of the back coat layer, and contributes to the reduction in the friction coefficient of the layer. However, coarse carbon black often drops away from the back coat layer in a severe driving system while a tape with it slides in the system, and therefore increases the error rate in recording or reading operation. Accordingly, using it too much is undesirable.

Fine carbon black for use in the invention is available on the market. Concretely, its commercial products are RAVEN 2000B (18 mμ), RAVEN 1500B (17 mμ) (both from Columbia Carbon); BP 800 (17 mμ) (from Cabbot); PRINTEX 90 (14 mμ), PRINTEX 95 (15 mμ), PRINTEX 85 (16 mμ), PRINTEX 75 (17 mμ) (all from Dexa); and #3950 (16 mμ) (from Mitsubishi Chemical). Commercial products of coarse fine black for use herein are Thermal Black (270 mμ) (from Carncarb), and RAVIN MTP (275 mμ) (from Columbia Carbon).

When the back coat layer contains carbon black of two types that differ in the mean particle size, the ratio (by weight) of fine carbon black having a mean particle size of from 10 to 20 mμ to coarse carbon black having a mean particle size of from 230 to 300 mμ therein preferably falls between 98/2 and 75/25, more preferably between 95/5 and 85/15. The carbon black content of the back coat layer (this shall be the total of fine carbon black and coarse carbon black, if combined) may fall generally between 30 and 80 parts by weight, but preferably between 45 and 65 parts by weight, relative to 100 parts by weight of the binder in the layer. The binder is described hereinunder.

In general, magnetic recording media for computer data recording thereon are much required to have better running durability in repeat operation, than video tapes and audio tapes. Adding calcium carbonate to the back coat layer of magnetic recording media for computer data recording thereon contributes to stabilizing the friction coefficient of the layer in repeat operation of the media, and it does not abrade the slide guide pole on which the media slide. Preferably, calcium carbonate which is optionally added to the back coat layer of the medium of the invention has a mean particle size of from 30 to 50 mμ. Coarse particles of calcium carbonate having a mean particle size of larger than 50 mμ are unfavorable, since they drop away from the back coat layer while the layer is repeatedly slid, and therefore cause dropout. In addition, the surface of the back coat layer, if containing such coarse particles, will be too rough, and the profile of the rough surface will be transferred onto the surface of the magnetic layer when a tape of the medium is wound up, thereby causing output depression. When a roll tape of the medium is stored in a high-temperature and high-humidity atmosphere, the lubricant therein will react with the ingredients of the magnetic layer as the back coat layer and the magnetic layer are kept in contact for long. On the other hand, too fine particles of calcium carbonate having a mean particle size of smaller than 30 mμ are also unfavorable to the back coat layer, since the amount of the calcium carbonate particles that may be in the surface of the back coat layer will decrease, and the particles will be ineffective. The calcium carbonate content of the back coat layer preferably falls between 10 and 140 parts by weight, more preferably between 35 and 100 parts by weight, relative to 100 parts by weight of carbon black in the layer.

Inorganic powder having a Mohs' hardness of from 5 to 9 may be added to the back coat layer, and it enhances the running durability of the tape (magnetic recording medium) in repeat operation and reinforces the back coat layer. When added to the back coat layer along with carbon black and calcium carbonate such as those mentioned above, the inorganic powder acts as a filler and protects the back coat layer from being deteriorated by its slide movement in repeat operation. Containing it, therefore, the back coat layer is reinforced by the inorganic powder. The inorganic powder that may be added to the back coat layer has such a relatively high Mohs' hardness of from 5 to 9, and it prevents the tape (magnetic recording medium) from adhering to a tape guide pole and other members owing to its frictional force. In particular, when added to the back coat layer along with calcium carbonate, the inorganic powder improves the property of the tape to well slide even on a guide pole having a rough surface, and, in addition, stabilizes the friction coefficient of the back coat layer. Preferably, the inorganic powder having a Mohs' hardness of from 5 to 9 for use in the invention has a mean particle size of from 80 to 250 mμ, more preferably from 100 to 210 mμ.

The inorganic powder having a Mohs' hardness of from 5 to 9 that may be added to the back coat layer includes, for example, α-iron oxide powder, α-alumina powder and chromium oxide ($Cr_2O_3$) powder. These powders may be used herein either singly or as combined. Of those, preferred are α-iron oxide powder and α-alumina powder. The content of the inorganic powder having a Mohs' hardness of from 5 to 9 in the back coat layer may fall generally between 3 and 30 parts by weight, but preferably between 3 and 20 parts by weight, relative to 100 parts by weight of carbon black therein. Especially preferably, the back coat layer of the medium of the invention contains carbon black of two types that differ in the mean particle size such as those mentioned above, calcium carbonate having a defined particle size as above, and inorganic powder having a specifically defined Mohs' hardness as above.

The back coat layer may contain a lubricant. The lubricant includes, for example, fatty acids and fatty acid esters. The fatty acids may be aliphatic carboxylic acids, such as acetic acid, propionic acid, octanoic acid, 2-ethylhexanoic acid, lauric acid, myristic acid, stearic acid, palmitic acid, behenic acid, arachic acid, oleic acid, linolic acid, linolenic acid, elaidic acid, and palmitoleic acid, and their mixtures are also usable herein.

The fatty acid esters may be various types of ester compounds, including, for example, butyl stearate, sec-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, a mixture of butyl stearate and butyl palmitate, oleyl oleate, butoxy-ethyl stearate, 2-butoxy-1-propyl stearate, dipropylene glycol monobutyl ether acylated with stearic acid, diethylene glycol dipalmitate, hexamethylenediol acylated with myristic acid, and glycerin oleate. These may be used herein either singly or as combined.

The lubricant selected from the compounds mentioned above may be added to the back coat layer, and its amount may fall generally between 1 and 5 parts by weight relative to 100 parts by weight of the binder in the layer.

The binder to be the constituent component of the back coat layer may be a thermoplastic resin, a thermosetting resin, a reactive resin, or their mixture. Examples of the thermoplastic resin are polymers and copolymers containing, as the constituent unit, any of vinyl chloride, vinyl acetate, vinyl alcohol, maleic acid, acrylic acid, acrylates, vinylidene chloride, acrylonitrile, methacrylic acid, methacrylates, styrene, butadiene, ethylene, vinyl butyral, vinyl acetal, and vinyl ethers. The copolymers include, for example, vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, vinylidene chloride-acrylonitrile copolymers, butadiene-acrylonitrile copolymers, styrene-butadiene copolymers, chlorovinyl ether-acrylate copolymers. In addition to these, also usable herein are polyamide resins, cellulose resins (e.g., cellulose acetate butyrate, cellulose diacetate, cellulose propionate, nitrocellulose), polyvinyl chloride, polyester resins, polyurethane resins, and rubber resins.

The thermosetting resins and reactive resins include, for example, phenolic resins, epoxy resins, curable polyurethane resins, urea resins, melamine resins, alkyd resins, acrylic reactive resins, formaldehyde resins, silicone resins, epoxy-polyamide resins, polyester resin/polyisocyanate prepolymer mixtures, polyester polyol/polyisocyanate mixtures, and polyurethane/polyisocyanate mixtures.

The amount of the binder to be in the back coat layer may fall generally between 5 and 100 parts by weight, but preferably between 10 and 80 parts by weight, relative to 100 parts by weight of the non-magnetic powder to form the layer.

The magnetic recording medium of the invention has, as the non-magnetic substrate (base film), a highly-tough, aromatic polyamide film, and the surface profile of its magnetic layer and that of its base film are specifically controlled. Therefore, its overall thickness can be reduced without lowering its recording capacity. Such high-capacity, thin tapes of the medium of the invention have good running durability, and the reliability for data recording and reading thereon is high. Accordingly, the medium of the invention is favorable to computer data recording thereon.

EXAMPLES

The invention is described more concretely with reference to the following Examples and Comparative Examples., which, however, are not intended to restrict the scope of the invention. Unless otherwise specifically indicated, "parts" are all by weight hereinunder.

The physical properties and the effects of the magnetic tapes produced herein are measured and evaluated according to the methods mentioned below.
(1) Young's modulus in tension:

Using Robot Tensilon RTA (from Orientec), the sample is measured at 20° C. and 60% RH. The sample piece tested has a size of 100 mm (width) x 50 mm (length), and the stretching speed is 300 mm/min. At the point at which the load applied to the sample has reached 0.1 kgf after the start of the test, the length of the elongated sample is read. This is the origin in measuring the elongation of the sample.
(2) Height and number of protrusions, and mean roughness of center surface:

Using an atomic force microscope (AFM), the surface of the sample is analyzed at 10 points, and the data obtained are averaged. Its details are as follows:

Device: Nanoscope III AFM (from Digital Instruments).
Cantilever: silicon single crystal.
Scanning mode: tapping mode.
Range scanned: 30 $\mu$m×30 $\mu$m.
Scanning speed: 0.5 Hz.
Atmosphere: 25° C., 65% RH.

In the following Examples and Comparative Examples, the surface of the base film not coated with a magnetic layer is analyzed. For analyzing the magnetic recording medium coated with a magnetic layer, the magnetic layer is removed by processing the medium in a strong acid such as hydrochloric acid or in an organic polar solvent such as N-methyl-2-pyrrolidone, and the thus-exposed base film is analyzed in the same manner as herein.
(3) Evaluation of magnetic recording medium:

The magnetic tape (sample) produced is evaluated according to the methods mentioned below.
(a) Reproduction output:

Using Sony's AIT Drive SDX-S300C., the sample is recorded at a relative recording speed of 10.04 m/sec, for which the shortest recording wavelength is 0.35 $\mu$m. The samples thus tested are evaluated relative to the sample (point: 100) of Example 1.
(b) Running durability:

According to the standard TM1 in ECMA using an AIT2 drive, the sample is run with the drive for 10000 P (passes). The number of passes at which the sample has failed to run owing to the increase in the error rate, is read. This indicates the running durability of the sample tested. Samples having passed at least 5000 cycles (5000 P) are on the level of practical use.

Example 1

Formation of Base Film:

Colloidal silica having a primary particle size of 80 nm was added to dewatered N-methyl-2-pyrrolidone (hereinafter referred to as NMP). The amount of the colloidal silica is 20% by weight of the solvent. This was dispersed for 10 hours with an ultrasonic stirrer, and then filtered. The resulting dispersion was added to an NMP solution of 90 mol % of 2-chloroparaphenylenediamine and 10 mol % of 4,4'-diaminodiphenyl ether. The amount of the colloidal silica was so controlled that it could be 0.05% by weight of the aromatic polyamide to be formed herein. Next, 98.5 mol % of 2-chloroterephthalic acid chloride was dropwise added to this, and stirred for 2 hours to polymerize the monomers. Then, this was neutralized with lithium carbonate. The resulting aromatic polyamide solution had a polymer concentration of 11% by weight.

The polymer solution was cast onto a stainless belt having a mirror surface, then heated at 160° C. for 1 minute and thereafter at 180° C. also for 1 minute by applying hot air thereto. The solvent was thus evaporated away. Next, the resulting film was passed through a water bath for 2 minutes, whereby the remaining solvent and the inorganic salt formed through neutralization were extracted out with water. In this step, the film was stretched by 1.2 times in the lengthwise direction. Next, this was put into a tenter, stretched by 1.3 times in the widthwise direction with hot air at 250° C. being applied thereto at an air flow rate of 5 m/sec, and then thermally fixed at 240° C. for 1.5 minutes. The thus-processed aromatic polyamide film had an overall thickness of 4.4 μm.

Formation of Magnetic Recording Medium (Magnetic Tape):

A vapor deposition device equipped with a continuous winder was degassed to have a degree of vacuum of around $10 \times 10^{-3}$ Pa, and the base film was set therein. In a minor oxygen atmosphere in the device, a magnetic layer of a thin ferromagnetic metal film of Co was deposited on the surface of the base film in a mode of continuous, vacuum oblique incident deposition. For the condition for oblique incident deposition, the incident angle of the cobalt vapor fell between 45° and 80° to the normal axis of the base film, the film-feeding speed was 50 m/min, and the intensity of the electron beams was so controlled that the thickness of the cobalt deposition could be 0.2 μm. Next, a magnetron sputtering device was degassed to have a degree of vacuum of around $10 \times 10^{-4}$ Pa, and Ar gas was introduced thereinto to have a pressure of around 0.8 Pa. With that, the base film having thereon the magnetic layer of Co was set in the magnetron sputtering device, in which the base film was run on a chill can cooled at −40° C., at a feeding speed of 5 m/min, and a protective carbon layer was thus formed on the magnetic layer of the base film. Next, a back coat layer was formed on the back surface of the base film opposite to the magnetic layer. After dried, the back coat layer had a thickness of 0.5 μm. The composition to form the back coat layer is mentioned below.

Composition for Back Coat Layer:

| | |
|---|---|
| Fine powder of carbon black (Cabbot's BP-800, having a mean particle size of 17 mμ) | 100 parts |
| Coarse powder of carbon black (Carncarb's thermal black, having a mean particle size of 270 mμ | 10 parts |
| Calcium carbonate (Shiraishi Kogyo's Hakuenka-O, having a mean particle size of 40 mμ | 80 parts |

-continued

| | |
|---|---|
| α-alumina (Sumitomo Chemical's HIT55. having a mean particle size of 200 mμ and a Mohs' hardness of 8.5) | 5 parts |
| Nitrocellulose resin | 140 parts |
| Polyurethane resin | 15 parts |
| Polyisocyanate resin | 40 parts |
| Polyester resin | 5 parts |
| Dispersant: | |
| copper oleate | 5 parts |
| copper phthalocyanine | 5 parts |
| barium sulfate | 5 parts |
| Methyl ethyl ketone | 2200 parts |
| Butyl acetate | 300 parts |
| Toluene | 600 parts |

Precisely, the ingredients for the back coat layer as above were kneaded in a continuous kneader and then dispersed in a sand mill. The resulting dispersion was filtered through a filter having a mean pore size of 1 μm. This is the coating liquid for the back coat layer.

In addition, a top coat layer of a lubricant, perfluoropolyether was formed on the protective carbon film, and a magnetic recording medium was thus completed. This was cut into a tape having a width of 8 mm. The tape was built in a cassette to be a cassette tape.

The surface characteristics of the base film are shown in Table 1; the surface characteristics of the magnetic recording medium are in Table 2; and the test data of the magnetic recording medium are in Table 3. (The same shall apply to the other Examples and Comparative Examples mentioned below.)

The magnetic recording medium produced herein was excellent.

Example 2 and Example 3

Other samples of the magnetic recording medium of the invention were produced in the same manner as in Example 1, of which, however, the thickness of the magnetic layer was varied as in Table 2.

Example 4

Another sample of the magnetic recording medium of the invention was produced in the same manner as in Example 1, for which, however, the colloidal silica added to NMP in preparing the polymer for the base film had a mean particle size of 120 nm, and its amount added was 0.02% by weight of the aromatic polyamide.

Example 5

Another sample of the magnetic recording medium of the invention was produced in the same manner as in Example 1, for which, however, the amount of 2-chloroparaphenylenediamine for the polymer for the base film was 60 mol % and that of 4,4'-diaminodiphenyl ether was 40 mol %. Since the mechanical strength of the base film prepared herein was not so good, the output and the running durability of the sample produced herein lowered in some degree.

Example 6

Another sample of the magnetic recording medium of the invention was produced in the same manner as in Example 1, for which, however, the amount of the fine powder of carbon black added to the coating composition for the back coat layer was 20 parts by weight. Since the parameter $N_{b(50)}$ of the surface of the back coat layer formed herein decreased a little and therefore the surface smoothness of the layer increased a little, the running durability of the sample produced herein lowered in some degree.

Example 7

Another sample of the magnetic recording medium of the invention was produced in the same manner as in Example 1, for which, however, polyether sulfone 7300P (from Sumitomo Chemical) was used in place of colloidal silica, its amount was 10% by weight of the aromatic polyamide, and the thickness of the magnetic layer was 0.1 μm.

Example 8

Another sample of the magnetic recording medium of the invention was produced in the same manner as in Example 1, for which, however, polyether sulfone 7300P (from Sumitomo Chemical) was used in place of colloidal silica, its amount was 10% by weight of the aromatic polyamide, and the thickness of the magnetic layer was 0.4 μm.

Example 9

Another sample of the magnetic recording medium of the invention was produced in the same manner as in Example 1, for which, however, polyether sulfone 7300P (from Sumitomo Chemical) was used in place of colloidal silica, its amount was 15% by weight of the aromatic polyamide, and the thickness of the magnetic layer was 0.1 μm.

Example 10

Another sample of the magnetic recording medium of the invention was produced in the same manner as in Example 1, for which, however, polyether sulfone 7300P (from Sumitomo Chemical) was used in place of colloidal silica, its amount was 15% by weight of the aromatic polyamide, and the thickness of the magnetic layer was 0.4 μm.

Comparative Example 1 and Comparative Example 2

Comparative magnetic recording media were produced in the same manner as in Example 1, of which, however, the thickness of the magnetic layer was varied as in Table 2. The reproduction output of these comparative samples was low. The running durability of the sample of Comparative Example 1 was poor.

Comparative Example 3 and Comparative Example 4

Comparative magnetic recording media were produced in the same manner as in Example 1, for which, however, the amount of colloidal silica added to NMP in preparing the polymer for the base film was 1.0% by weight and 0.002% by weight of the aromatic polyamide. The reproduction output of the sample of Comparative Example 3 was low; and the running durability of the sample of Comparative Example 4 was poor.

TABLE 1

|  | Film Thickness (μm) | Young's Modulus (GPa) | $N_{a(10)}'$ (*) | Surface Roughness (nm) |
|---|---|---|---|---|
| Example 1 | 4.4 | 13.2 | 52 | 2.3 |
| Example 2 | 4.4 | 13.2 | 52 | 2.3 |
| Example 3 | 4.4 | 13.2 | 52 | 2.3 |
| Example 4 | 4.4 | 13.2 | 33 | 1.9 |
| Example 5 | 4.4 | 8.6 | 57 | 2.5 |
| Example 6 | 4.4 | 13.2 | 52 | 2.3 |
| Example 7 | 4.4 | 12.6 | 590 | 3.3 |
| Example 8 | 4.4 | 12.6 | 590 | 3.3 |
| Example 9 | 4.4 | 12.2 | 1350 | 5.2 |
| Example 10 | 4.4 | 12.2 | 1350 | 5.2 |
| Comp. Ex. 1 | 4.4 | 13.2 | 52 | 2.3 |
| Comp. Ex. 2 | 4.4 | 13.2 | 52 | 2.3 |
| Comp. Ex. 3 | 4.4 | 13.2 | 390 | 2.7 |
| Comp. Ex. 4 | 4.4 | 13.2 | 0.2 | 0.7 |

(*): × $10^4$/mm$^2$

TABLE 2

|  | Thickness of Magnetic Layer (μm) | Overall Thickness (μm) | $N_{a(10)}$ (*) | $N_{a(50)}$ (*) | $[N_{a(10)} - N_{a(10)}']/N_{a(10)}'$ | $N_{b(50)}$ (*) | $N_{b(100)}$ (*) |
|---|---|---|---|---|---|---|---|
| Example 1 | 0.2 | 5.1 | 14 | 1 | −0.73 | 8.3 | 0.27 |
| Example 2 | 0.4 | 5.3 | 8 | 0.6 | −0.85 | 8.3 | 0.27 |
| Example 3 | 0.08 | 5.0 | 37 | 1.5 | −0.29 | 8.3 | 0.27 |
| Example 4 | 0.2 | 5.1 | 27 | 2 | −0.18 | 8.7 | 0.27 |
| Example 5 | 0.2 | 5.1 | 16 | 1 | −0.72 | 8.3 | 0.27 |
| Example 6 | 0.2 | 5.1 | 14 | 1 | −0.73 | 1.1 | 0.15 |
| Example 7 | 0.1 | 5.0 | 410 | 0 | −0.31 | 8.3 | 0.27 |
| Example 8 | 0.4 | 5.3 | 250 | 0 | −0.58 | 8.3 | 0.27 |
| Example 9 | 0.1 | 5.0 | 1200 | 0 | −0.11 | 8.3 | 0.27 |
| Example 10 | 0.4 | 5.3 | 960 | 0 | −0.28 | 8.3 | 0.27 |
| Comp. Ex. 1 | 0.7 | 5.6 | 0.34 | 0 | −0.99 | 8.3 | 0.27 |
| Comp. Ex. 2 | 0.02 | 4.9 | 54 | 2.5 | 0.04 | 8.3 | 0.27 |
| Comp. Ex. 3 | 0.2 | 5.1 | 380 | 12 | −0.03 | 11.4 | 0.27 |
| Comp. Ex. 4 | 0.2 | 5.1 | 0.1 | 0 | −0.50 | 8.3 | 0.27 |

(*): × $10^4$/mm$^2$

TABLE 3

|  | Reproduction Output | Running Durability |
| --- | --- | --- |
| Example 1 | 100 | 10000 P finished |
| Example 2 | 120 | 10000 P finished |
| Example 3 | 95 | 10000 P finished |
| Example 4 | 90 | 10000 P finished |
| Example 5 | 90 | 8000 P |
| Example 6 | 100 | 7000 P |
| Example 7 | 130 | 10000 P finished |
| Example 8 | 120 | 9000 P |
| Example 9 | 110 | 10000 P finished |
| Example 10 | 105 | 10000 P finished |
| Comp. Ex. 1 | 77 | 3000 P |
| Comp. Ex. 2 | 80 | 10000 P finished |
| Comp. Ex. 3 | 56 | 10000 P finished |
| Comp. Ex. 4 | 130 | 2000 P |

What is claimed is:

1. A magnetic recording medium having a magnetic layer directly formed on at least one surface of a base film that comprises, as the essential ingredient, an aromatic polyamide, in which the number of protrusions having a height of at least 10 nm on the surface of the magnetic layer, $N_{a(10)}$ (/mm$^2$), the number of protrusions having a height of at least 50 nm thereon, $N_{a(50)}$ (/mm$^2$), and the number of protrusions having a height of at least 10 nm on the surface of the base film coated with the magnetic layer, $N_{a(10)}'$ (/mm$^2$), all satisfy the following formulae:

$$2\times10^4 \leq N_{a(10)} \leq 2\times10^7,$$

$$0 \leq N_{a(50)} \leq 5\times10^4,$$

$$-0.9 \leq (N_{a(10)}-N_{a(10)}')/N_{a(10)}' \leq 0.$$

2. The magnetic recording medium as claimed in claim 1, wherein $N_{a(10)}$ satisfies the following formula:

$$2\times10^4 \leq N_{a(10)} \leq 5\times10^6.$$

3. The magnetic recording medium as claimed in claim 1, wherein $N_{a(10)}$ and $N_{a(10)}'$ both satisfy the following formulae:

$$10^6 \leq N_{a(10)} \leq 5\times10^6,$$

$$-0.7 \leq (N_{a(10)}-N_{a(10)}')/N_{a(10)}' \leq 0.$$

4. The magnetic recording medium as claimed in claim 1, wherein a back coat layer is formed on the surface of the base film opposite to the magnetic layer, the number of protrusions having a height of at least 50 nm, $N_{b(50)}$ (/mm$^2$) on the surface of the back coat layer, and the number of protrusions having a height of at least 100 nm thereon, $N_{b(100)}$ (/mm$^2$), both satisfy the following formulae:

$$2\times10^4 \leq N_{b(50)} \leq 5\times10^6,$$

$$0 \leq N_{b(100)} \leq 5\times10^4.$$

5. The magnetic recording medium as claimed in claim 1, wherein the base film has a Young's modulus of at least 9.8 GPa in at least one direction.

6. The magnetic recording medium as claimed in claim 1, wherein the base film has a thickness of from 1 to 5 μm.

7. The magnetic recording medium as claimed in claim 1, wherein the magnetic layer has a thickness of from 0.02 to 0.5 μm.

8. The magnetic recording medium as claimed in claim 1, wherein the magnetic layer is formed through vapor deposition.

* * * * *